(12) United States Patent
Hyon et al.

(10) Patent No.: US 8,004,995 B2
(45) Date of Patent: Aug. 23, 2011

(54) METHOD AND APPARATUS FOR MANAGING A COOPERATIVE DIVERSITY SYSTEM

(75) Inventors: Tae In Hyon, Hwaseong-si (KR); Jae Myoung Kim, Hwaseong-si (KR); Jae Hak Chung, Seoul (KR); Sang Jo Yoo, Seoul (KR); Sung Hwan Sohn, Seoul (KR)

(73) Assignees: Samsung Electronics Co., Ltd. (KR); INHA-Industry Partnership Institute (KR)

( * ) Notice: Subject to any disclaimer, the term of this patent is extended or adjusted under 35 U.S.C. 154(b) by 1119 days.

(21) Appl. No.: 11/755,310

(22) Filed: May 30, 2007

(65) Prior Publication Data

US 2008/0165880 A1 Jul. 10, 2008

(30) Foreign Application Priority Data

Jan. 5, 2007 (KR) ........................ 10-2007-0001462

(51) Int. Cl.
*H04W 4/00* (2009.01)

(52) U.S. Cl. ........ 370/241; 370/462; 370/465; 455/423; 455/434

(58) Field of Classification Search .................. 370/328, 370/329, 332, 226, 337, 345, 348; 455/422.1, 455/445, 451, 452
See application file for complete search history.

(56) References Cited

U.S. PATENT DOCUMENTS

| | | | |
|---|---|---|---|
| 5,799,245 A * | 8/1998 | Ohashi | 455/69 |
| 7,280,814 B2 * | 10/2007 | Austin et al. | 455/278.1 |
| 7,715,787 B2 * | 5/2010 | Yoon et al. | 455/13.1 |
| 2007/0202867 A1 * | 8/2007 | Waltho et al. | 455/423 |
| 2007/0248173 A1 * | 10/2007 | Hassan et al. | 375/260 |
| 2009/0052570 A1 * | 2/2009 | Haykin | 375/267 |

* cited by examiner

*Primary Examiner* — Kevin C Harper
*Assistant Examiner* — Henry Baron
(74) *Attorney, Agent, or Firm* — NSIP Law

(57) ABSTRACT

A cooperative diversity method and apparatus that can minimize interference and maximize an efficiency of a transmission channel between terminals of a cooperative diversity pair, the method including: determining a pair of terminals to be a cooperative diversity pair according to a spectrum sensing result of a cognitive radio (CR); selecting a subchannel through which data is exchanged between the pair of terminals; and transmitting the data between the pair of terminals through the selected subchannel.

40 Claims, 11 Drawing Sheets

< SPECTRUM SENSING RESULT IN FIRST CLUSTER >

< SPECTRUM SENSING RESULT IN SECOND CLUSTER >

METHOD AND APPARATUS FOR MANAGING A COOPERATIVE DIVERSITY SYSTEM

CROSS-REFERENCE TO RELATED APPLICATION

This application claims the benefit of Korean Patent Application No.-2007-1462, filed Jan. 5, 2007 in the Korean Intellectual Property Office, the disclosure of which is incorporated herein by reference.

BACKGROUND OF THE INVENTION

1. Field of the Invention

Aspects of the present invention relate to a wireless communication system, and more particularly, to a cooperative diversity method and apparatus in a wireless communication system.

2. Description of the Related Art

As wireless multimedia services become more common, there is a greater need for wirelessly transmitting high speed information. In order to transmit more information, more frequency bands are needed. However, because there are restrictions on usable frequency bands, a multi-antenna system according to a related art maximizes the transmission capacity of a system in a restricted frequency band.

The multi-antenna system can be divided into a method of increasing a multiplexing gain by increasing a transmission capacity of a channel, and a method of increasing a diversity gain by improving a reliability of a link without reducing a transmission capacity. In particular, the method of increasing the diversity gain uses a multi-antenna to generate a plurality of independent fading channels and obtaining the gain.

Also, an orthogonal frequency division multiple access (OFDMA) method is a parallel type data transmission method using an orthogonality of each subcarrier. The OFDMA method has a high usage efficiency of a frequency, a characteristic appropriate for a multi-channel environment, and a simple structure of a channel compensator. Accordingly, the method of using the multi-antenna and the OFDMA method are selected as basic transmission methods in a system requiring high speed data transmission. Combining the OFDMA method with the multi-antenna system can increase a transmission capacity or reliability of a link.

However, when the multi-antenna is used, a minimum distance between antennas is required to maximize performance. Accordingly, transmission diversity is generally used in only a base station rather than in a terminal. A cooperative diversity technology is provided in order to solve this limitation. The cooperative diversity technology is expected to obtain a diversity gain similar or proportionate to a gain when a multi-antenna is used by binding different and independent mobile phones or terminals and generating a plurality of independent fading channels in each mobile phone or each terminal.

However, a cooperative diversity technology according to a related art has the following problems. First, since an optimum method of selecting a mobile phone or a terminal to be operated in a cooperative diversity mode is not provided in the related art, the diversity gain cannot be maximized. Second, since a wireless resource is additionally allocated for data exchange between terminals to be operated in a cooperative diversity mode according to the related art, an efficiency of a frequency or time resource is reduced.

SUMMARY OF THE INVENTION

Aspects of the present invention provide a cooperative diversity method and apparatus that can retrieve an optimum terminal pair to be operated in a cooperative diversity mode in order to maximize a diversity gain. Aspects of the present invention also provide a cooperative diversity method and apparatus that can realize a cooperative diversity technology, and reuse an existing channel without allocating a separate channel for data exchange between terminals of the cooperative diversity pair, thereby significantly improving efficiency of a wireless resource.

According to an aspect of the present invention, there is provided a cooperative diversity method including: determining a first terminal and a second terminal to be a first cooperative diversity pair according to a spectrum sensing result of a cognitive radio (CR) for each of the first terminal and the second terminal; selecting a subchannel through which data is exchanged between the first terminal and the second terminal; and transmitting the data between the first terminal and the second terminal through the selected subchannel.

According to another aspect of the present invention, there is provided a cooperative diversity apparatus including: a determiner to determine a first terminal and a second terminal to be a cooperative diversity pair according to a spectrum sensing result of a CR for each of the first terminal and the second terminal; a selector to select a subchannel through which data is exchanged between the first terminal and the second terminal; and a transmitter to transmit the data between the first terminal and the second terminal through the selected subchannel.

According to another aspect of the present invention, there is provided a cooperative diversity method in a wireless communication system, the method including: determining a first terminal and a second terminal to be a cooperative diversity pair according to a spectrum sensing result of a cognitive radio (CR) for each of the first terminal and the second terminal.

According to another aspect of the present invention, there is provided a cooperative diversity method in a wireless communication system, the method including: selecting an existing subchannel that is used to transmit and receive data to/from a base station; and transmitting data between a first terminal and a second terminal of a first cooperative diversity pair through the selected subchannel.

According to another aspect of the present invention, there is provided a terminal of a cooperative diversity system, the terminal comprising: a determiner to determine another terminal to bind to, in order to create a cooperative diversity pair, according to a spectrum sensing result of a cognitive radio (CR) for each of the terminal and the other terminal.

According to another aspect of the present invention, there is provided a cooperative diversity system comprising: a first cooperative diversity pair comprising a first terminal and a second terminal, and selecting a data exchange subchannel through which data of the first terminal and the second terminal is exchanged between the first terminal and the second terminal; a base station to which data is transmitted; and a second cooperative diversity pair that transmits the data to the base station through the data exchange subchannel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
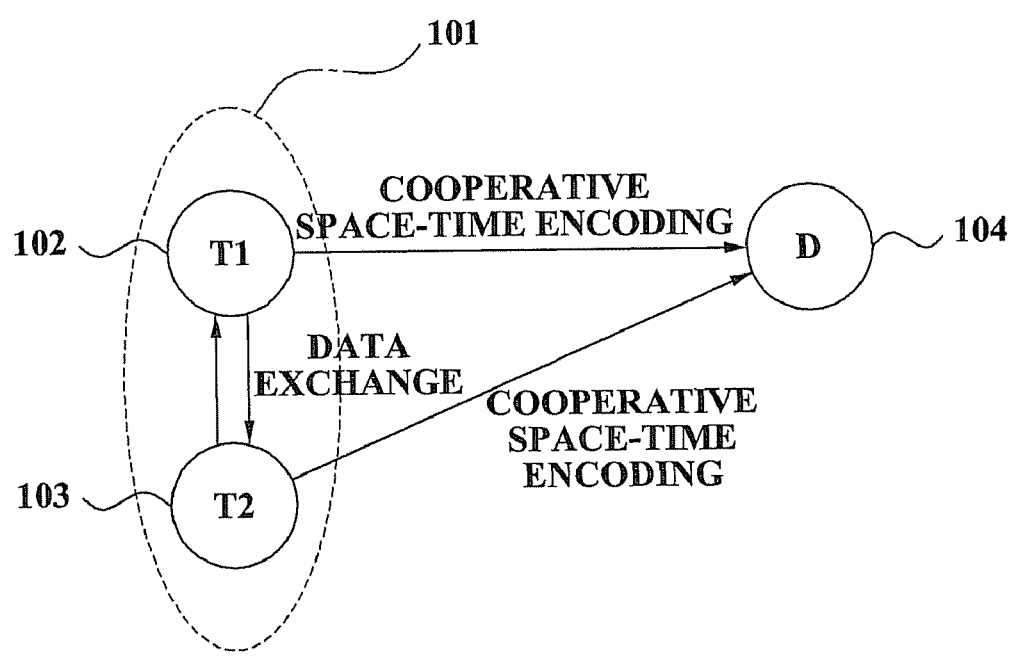
FIG. 1 is a diagram illustrating one cluster that configures a cooperative diversity pair according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A method of determining two terminals configuring a cooperative diversity pair that can minimize electromagnetic wave interference will now be described with reference to FIG. 1. FIG. 1 is a diagram illustrating one cluster that configures a cooperative diversity pair according to an embodiment of the present invention.

According to aspects of the present invention, an existing frequency is reused without adding a separate wireless resource for data exchange between terminals configuring a cooperative diversity pair. Therefore, the use of little power is required for the data exchange between the terminals so as not to introduce interference in a reused frequency. Moreover, when the data is exchanged between the terminals, reliable data exchange is needed. Accordingly, the terminals should be sufficiently adjacent in order to transmit reliable data with little power.

Specifically, aspects of the present invention can use spectrum sensing information in a cognitive radio (CR) technology to retrieve significantly adjacent terminals. The CR technology is a technology that senses an allocated frequency band that is not actually being used, and efficiently shares and uses the frequency band. The terminal is an apparatus that transmits and receives data to and from a base station via a wireless interface based on a CR system. For example, the terminal may be a mobile phone or a personal digital assistant (PDA). The base station (BS) is an apparatus that transmits and receives data to and from the terminal via a wireless interface based on the CR system, and observes communication controls performed in a communication area of a corresponding device. Furthermore, spectrum sensing in the CR technology is a method in which a sensing terminal recognizes a spectrum status in a present location of a corresponding device, wherein an adjacent terminal has a similar spectrum sensing result.

Accordingly, an aspect of the present invention binds terminals having a similar spectrum sensing result as one cluster, and selects the terminals in the bound cluster as a cooperative diversity pair. The similar spectrum sensing result can indicate a case where graphs obtained by spectrum sensing among terminals are most similar, and can indicate a case where samples of data values are most similar. Also, the similar spectrum sensing result can indicate other cases where those skilled in the art can easily change a design. Specifically, a method of using the similar spectrum sensing result can include seeking data values according to time, calculating a difference of the data values according to time for each terminal, and binding terminals having the least differences as one cluster. Also, the method of using the similar spectrum sensing result can include adding every data value according to time, calculating a difference of the sum of the data values for each terminal, and binding terminals having the least differences as one cluster.

As illustrated in FIG. 1, a first terminal 102 and a second terminal 103 configure a cooperative diversity pair (a first cluster 101). Terminals 102 and 103 that configure the cooperative diversity pair 101 are separated by a relatively short distance in which an effect of interference is minimized.

A pair of terminals 102 and 103 operated in the cooperative diversity pair (i.e., the first cluster 101) exchange data via a predetermined subchannel. The exchanged data is transmitted from each terminal 102 and 103 to a base station 104 via a space-time encoding process. It is understood that the space-time encoding process is a non-limiting example, and other encoding processes can be used instead of the space-time encoding process. The base station 104 decodes the data transmitted from the terminals 102 and 103. For convenience of description, a space-time encoding example can be shown as Equation 1:

$$H = \begin{pmatrix} S_1 & S_2 \\ -S_2^* & S_1^* \end{pmatrix} \quad \text{[Equation 1]}$$

Equation 1 is an Alamouti code. Columns of Equation 1 indicate each terminal, and rows of Equation 1 indicate time.

As stated above, terminals 102 and 103 operate in the cooperative diversity mode (i.e. the first cluster 101) and exchange data via a predetermined subchannel. According to aspects of the present invention, the subchannel may be a reused subchannel used in a different cluster and/or allocated to each terminal 102 and 103 of the cooperative diversity mode 101.

Figure 2:
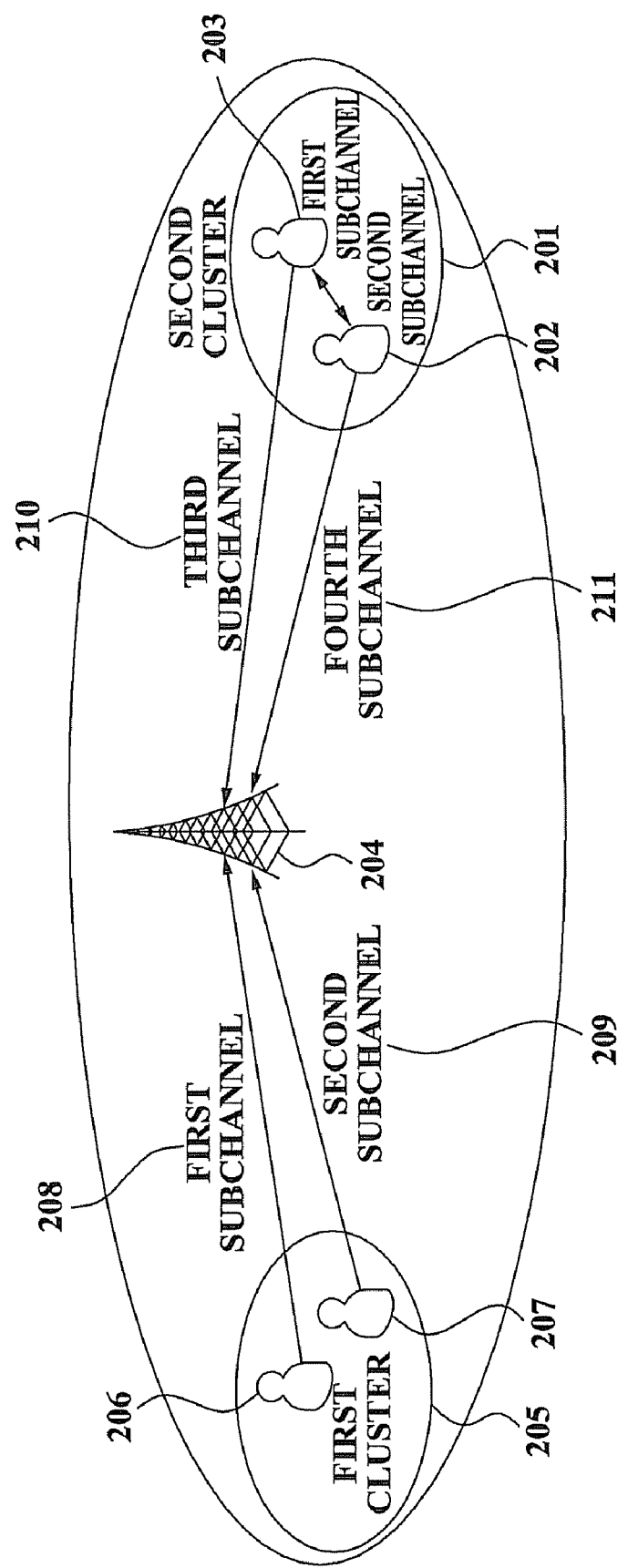
FIG. 2 is a diagram illustrating a cluster of a cooperative diversity pair that uses a subchannel of another cluster according to an embodiment of the present invention.

FIG. 2 is a diagram illustrating a cluster of a cooperative diversity pair that uses a subchannel of another cluster according to an embodiment of the present invention. Specifically, FIG. 2 illustrates a wireless communication environment of a point to multi-point structure. In the wireless communication environment, uplink power of a subchannel allocated to each terminal is restricted in order to reduce interference between cells, terminals, or clusters. The uplink is a transmission channel from a terminal to a base station. Conversely, a downlink is a transmission channel from a base station to a terminal. According to an aspect of the present invention, reusing a subchannel used in a different cluster uses the above-described characteristic in a wireless communication environment of a point to multi-point structure.

As illustrated in FIG. 2, a second cluster 201 operated in a cooperative diversity mode is sufficiently spaced apart from a first cluster 205. In this instance, a transmission power of terminals 206 and 207 in the first cluster 205 is at a certain maximum level in order to minimize interference of an adjacent cell in a general point to multi-point structure. Accordingly, it is assumed that power transmitted to the second cluster 201 is limited. Also, the second cluster 201 can use subchannels of the first cluster 205, though limited to a regionally small range.

A first terminal 202 and a second terminal 203 of the second cluster 201 can exchange data through a first subchannel 208 and a second subchannel 209 used for an uplink of the first cluster 205. Uplink data exchanged via the first subchannel 208 and the second subchannel 209 in the second cluster 201 is encoded in space-time before being transmitted to a base station 204 via a third subchannel 210 and a fourth subchannel 211 allocated to the terminals 202 and 203 of the second cluster 201. It is understood that the space-time encoding is a non-limiting example, and other encoding methods can be used instead of the space-time encoding method. Because power of the first subchannel 208 and the second subchannel 209 used when data is exchanged between the terminals 202 and 203 of the second cluster 201 is even less than uplink power, an effect of interference is slight in the uplink of terminals 206 and 207 of the first cluster 205.

Figure 3:
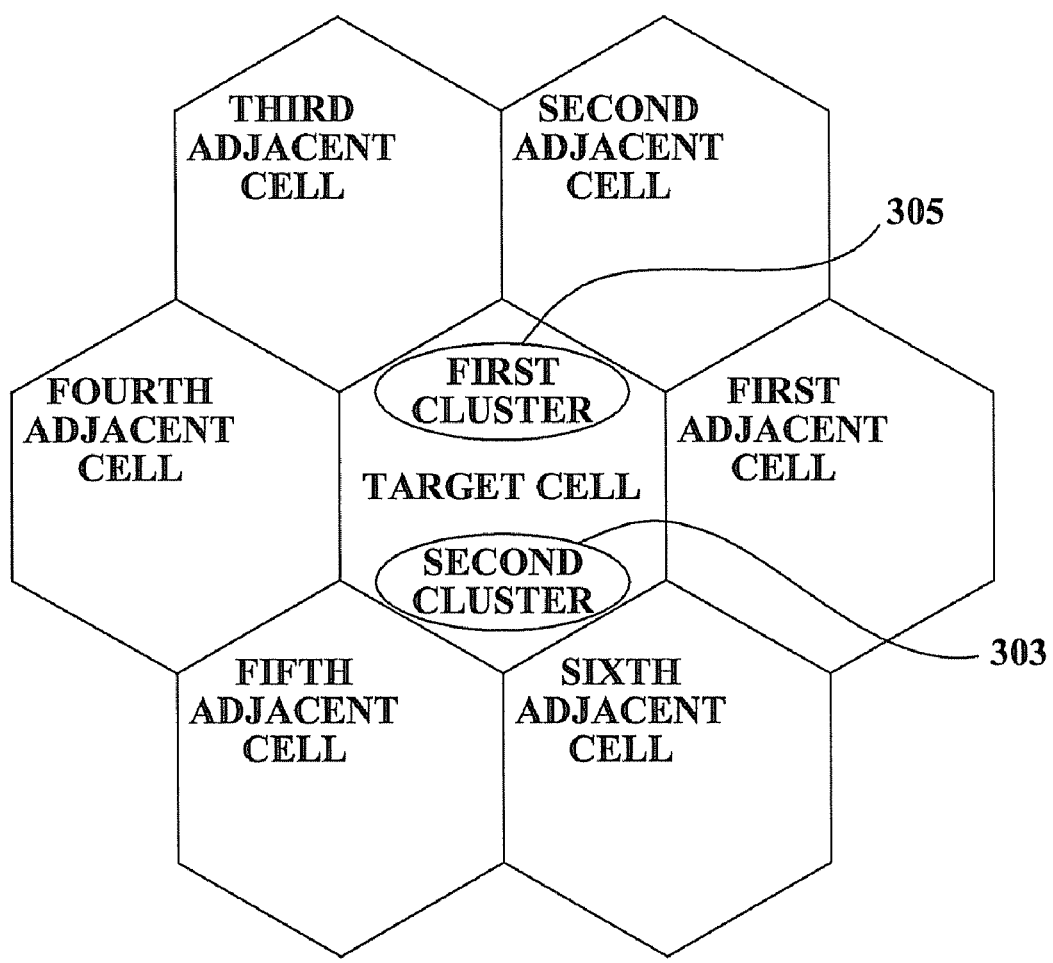
FIG. 3 is a diagram illustrating a process in which one cluster of a cooperative diversity pair selects another cluster to minimize interference from among various clusters according to an embodiment of the present invention.
Figure 4A:
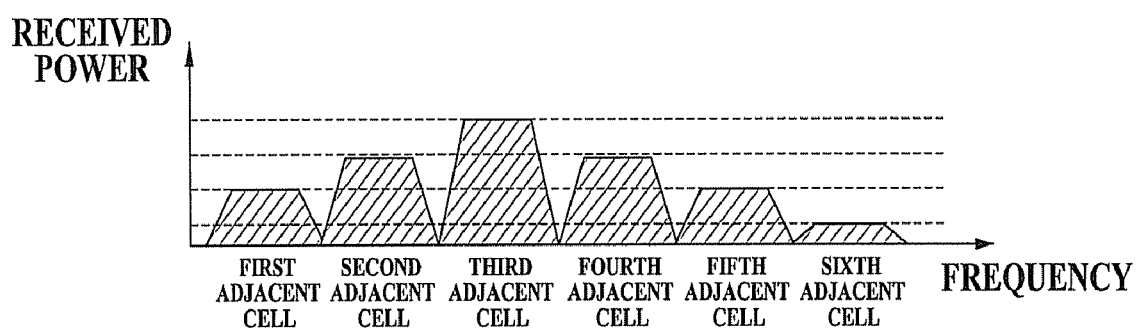
FIG. 4A is a diagram illustrating a spectrum sensing result in a first cluster illustrated in FIG. 3.
Figure 4B:
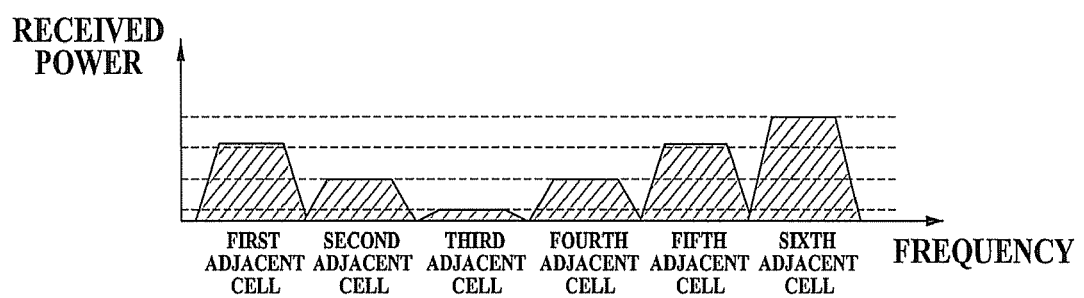
FIG. 4B is a diagram illustrating a spectrum sensing result in a second cluster illustrated in FIG. 3.

A method of determining a cluster that can minimize an effect of interference is described with reference to FIGS. 3, 4A, and 4B. FIG. 3 is a diagram illustrating a process in which one cluster, which configures a cooperative diversity pair according to an embodiment of the present invention, selects another cluster to minimize interference from among various clusters. FIG. 4A is a diagram illustrating a spectrum sensing result in a first cluster 305 illustrated in FIG. 3. FIG. 4B is a diagram illustrating a spectrum sensing result in a second cluster 303 illustrated in FIG. 3. Hereinafter, referring to FIGS. 3 though 4B, a method of retrieving a second cluster 303 for data exchange between terminals configuring a cooperative diversity that can minimize interference while using an existing channel is described as follows.

In a communication system that is distributed as illustrated in FIG. 3, a spectrum environment in a first cluster 305 and a spectrum environment in a second cluster 303 are different due to a power difference of signals from adjacent cells. For example, as illustrated in the spectrum sensing result in the first cluster 305 shown in FIG. 4A, a signal of a third adjacent cell is strongest and a signal of a sixth adjacent cell is weakest. Conversely, as illustrated in the spectrum sensing result of a terminal in the second cluster 303 shown in FIG. 4B, a signal of a sixth adjacent cell is strongest and a signal of a third adjacent cell is weakest. Specifically, the CR technology can read and extract information with respect to a cluster operated in a cooperative diversity mode (for example, the second cluster 201 in FIG. 2) and another cluster (for example, the first cluster 205 in FIG. 2) that is sufficiently spaced apart from the cluster operated in the cooperative diversity mode, wherein each cluster or each terminal has different spectrum environments according to a location.

Figure 5:
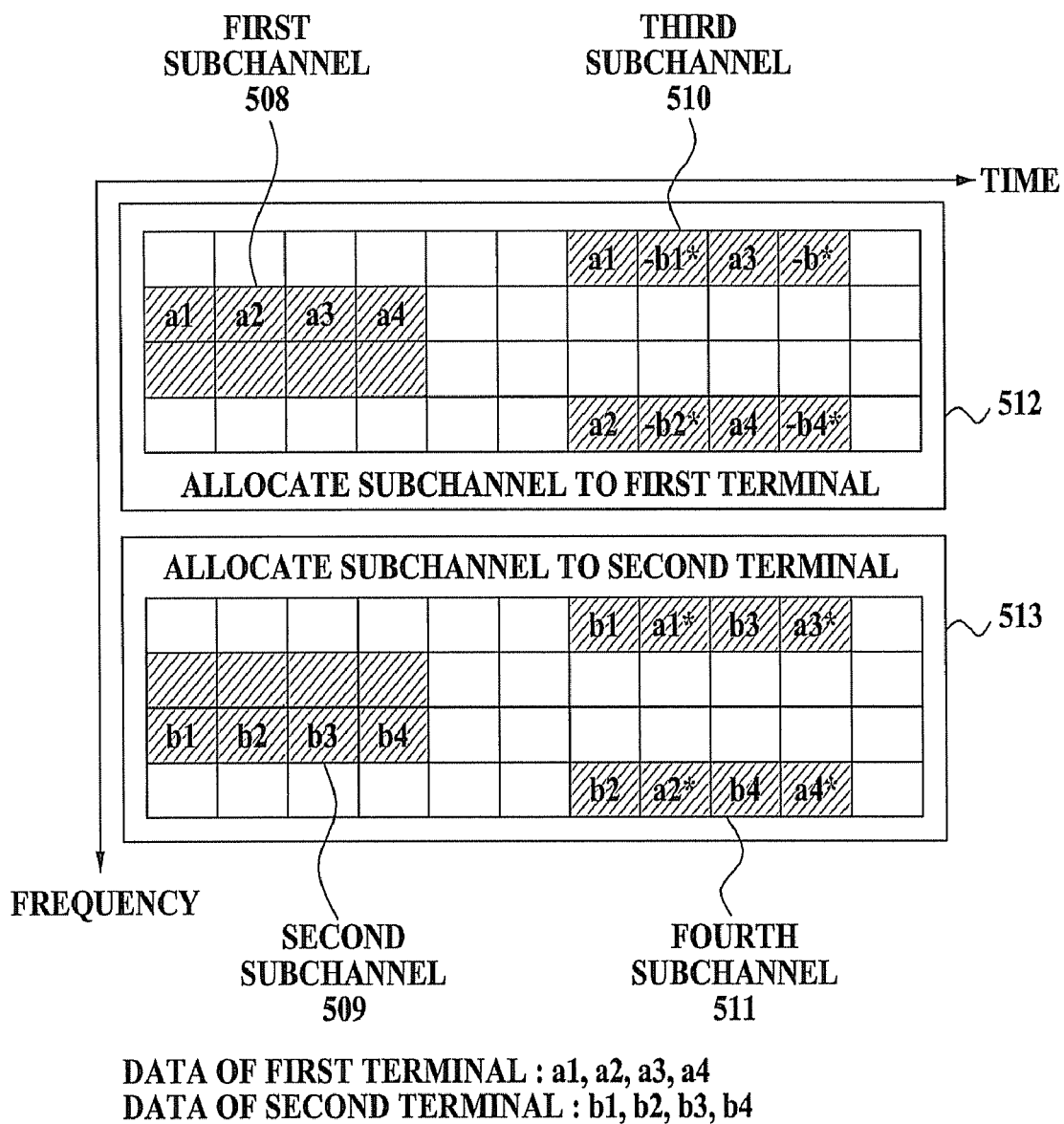
FIG. 5 is a diagram illustrating a process of exchanging data between terminals of a cooperative diversity pair and space-time encoding the exchanged data according to an embodiment of the present invention.

FIG. 5 is a diagram illustrating a process of exchanging data between terminals of a cooperative diversity pair and space-time encoding the exchanged data according to an embodiment of the present invention. Referring to FIG. 5, when a subchannel used in a different cluster is reused, a method of allocating a subchannel for data exchange between terminals operated in a cooperative diversity mode is described as follows. As illustrated in FIG. 5, a horizontal axis (X axis) is a time domain and a vertical axis (Y axis) is a frequency domain. It is understood that the horizontal axis and the vertical axis can be exchanged with each other. Boxes of an upper portion 512 indicate data transmitted from the first terminals 102 and 202, and boxes of a lower portion 513 indicate data transmitted from the second terminals 103 and 203.

Referring to FIGS. 2 and 5, the first terminal 202 and the second terminal 203 configuring the second cluster 201 exchange data to be transmitted to the base station 204 using the first subchannel 208 and 508 and the second subchannel 209 and 509 allocated to the first cluster 205. In this instance, as described above, since a distance between the first terminal 202 and the second terminal 203 is relatively small, data transmission power between the first terminal 202 and the second terminal 203 can be less than uplink power used in the first cluster 205. Accordingly, although the second cluster 201 uses a subchannel of the first cluster 205, little interference is generated.

The data exchanged through the first subchannel 208 and 508 and the second subchannel 209 and 509 is transmitted to the base station 204 through the third subchannel 210 and 510 and the fourth subchannel 211 and 511 allocated to each terminal 202 and 203. Also, in this instance, the exchanged data is transmitted to the base station 204 via a space-time encoding process similar to Equation 1 described above in order to obtain a transmission diversity gain. It is understood that the space-time encoding is a non-limiting example, and other encoding methods can be used instead of the space-time encoding method.

Figure 6:
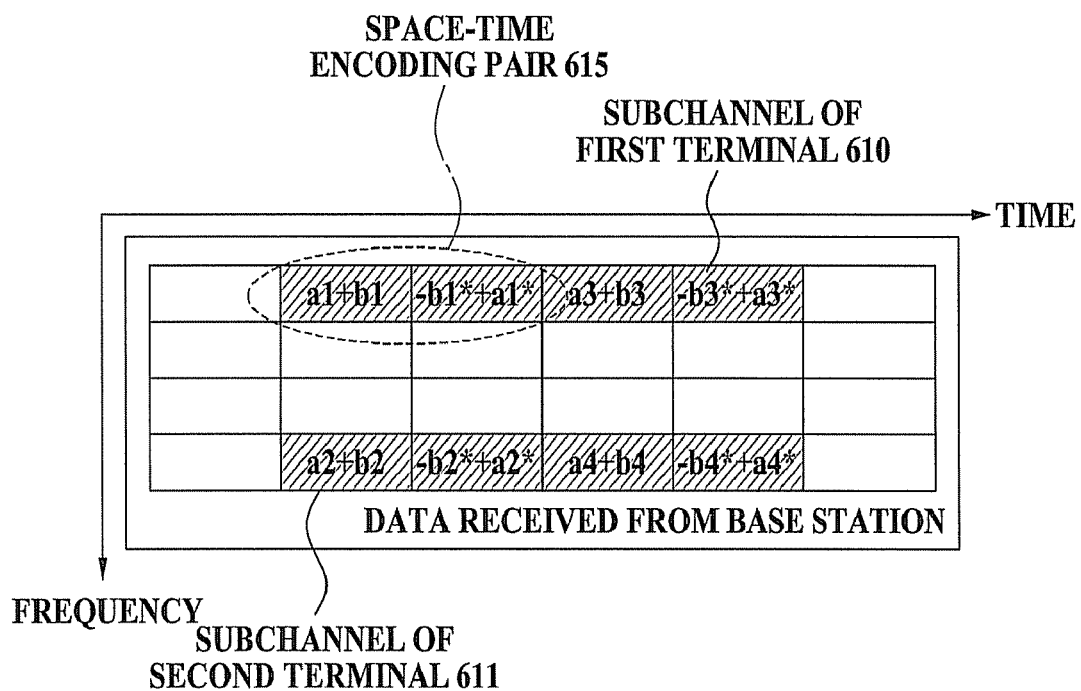
FIG. 6 is a diagram illustrating a form of space-time encoded data in FIG. 5 that a base station receives.

FIG. 6 is a diagram illustrating a form of space-time encoded data of FIG. 5 that a base station receives. Hereinafter, referring to FIG. 6, a process in which a base station receives data transmitted via a space-time encoding process in FIG. 5 is described as follows.

Referring to FIGS. 2 and 6, data received via a subchannel of the first terminal 210 and 610 and a subchannel of the second terminal 211 and 611 is shown as an addition to data that the first terminal 202 and the second terminal 203 simultaneously transmit. The received data configures a space-time encoding pair 615 that is successive in time and corresponds to a received signal according to a space-time encoding equation of a 2×2 matrix such as that used in Equation 1 described above. Effects of channel influence are omitted in FIG. 6.

A base station receiving the data can decode the received data via a space-time decoding process, such as Equation 2:

$$a_i = h^*_{1i} r_i + h_{2i} r^*_{(i+1)}$$

$$b_i = h^*_{2i} r_i - h_{1i} r^*_{(i+1)} \qquad \text{[Equation 2]}$$

(i=1, 3, 5, 7, ... )

A method of decoding the data transmitted via the subchannel of the second terminal 211 and 611 is similar to Equation 2. In Equation 2, $a_i$ and $b_i$ indicate i-th data of the first terminal and the second terminal, respectively. $h_{1i}$ and $h_{2i}$ indicate channel responses of the first terminal and the second terminal, respectively. $r_1$ and $r_2$ indicate a first received signal and a second received signal, respectively.

A method of using a subchannel allocated to a cluster, which is sufficiently spaced apart from a cluster operated in a cooperative diversity mode, as a channel for data exchange between terminals operated in the cooperative diversity mode is described above. Hereinafter, a method of exchanging subchannels allocated to terminals operated in a cooperative diversity mode (i.e., another embodiment of the present invention) is described.

Figure 7A:
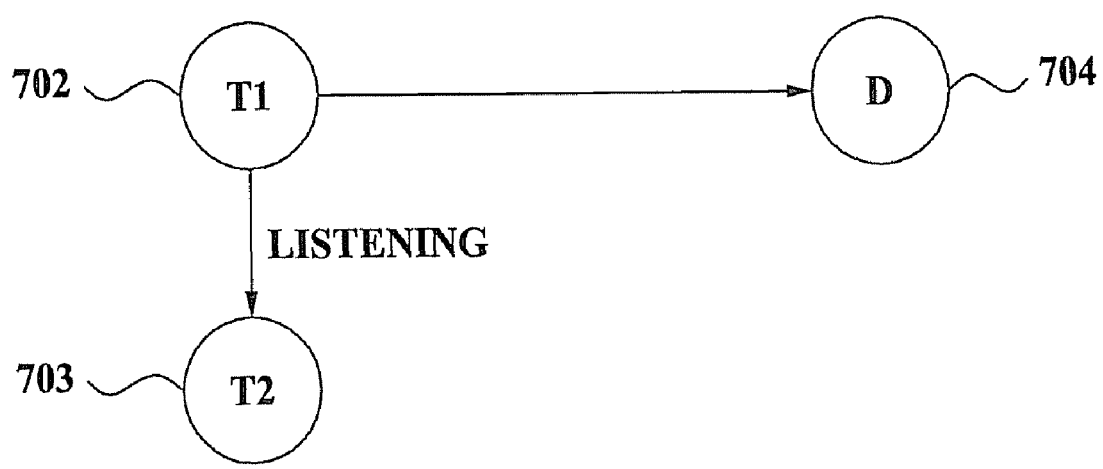
FIG. 7A is a diagram illustrating a listening-to process of one cluster that configures a cooperative diversity pair according to another embodiment of the present invention.
Figure 7B:
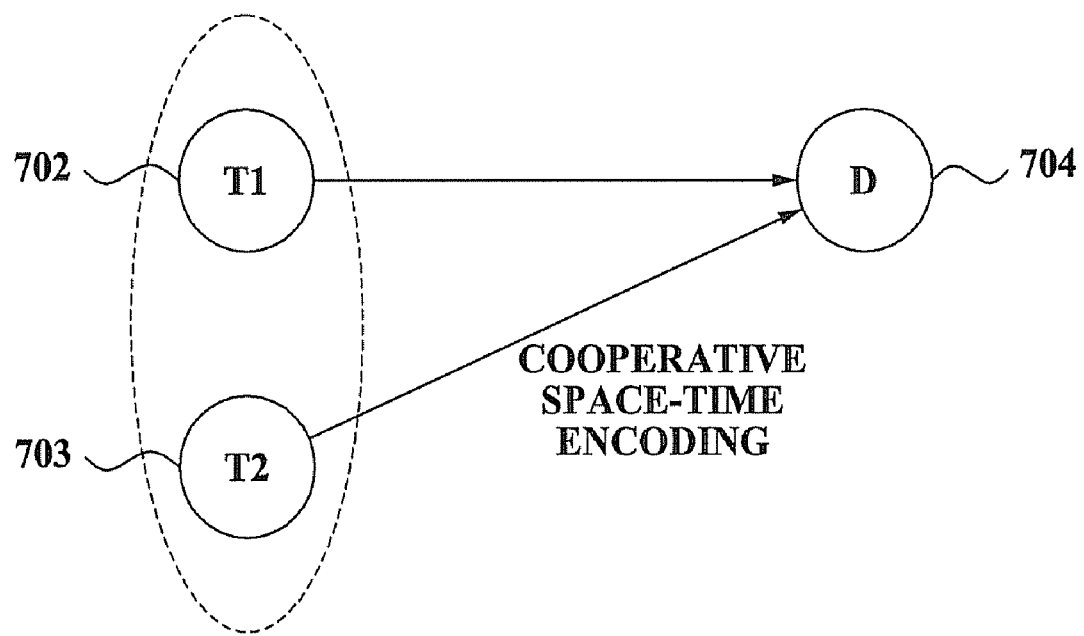
FIG. 7B is a diagram illustrating a space-time encoding process of one cluster that configures a cooperative diversity pair according to another embodiment of the present invention.

FIG. 7A is a diagram illustrating a listening-to process of one cluster, which configures a cooperative diversity pair according to another embodiment of the present invention. FIG. 7B is a diagram illustrating a space-time encoding process of one cluster, which configures a cooperative diversity pair according to another embodiment of the present invention. Referring to FIGS. 7A and 7B, a method of exchanging a subchannel allocated to a terminal operated in a cooperative diversity mode, and using the subchannel to exchange data between the terminals is described as follows.

Aspects of the present invention provide an operation of listening to the subchannels (as illustrated in FIG. 7A) and a cooperative space-time encoding operation (as illustrated in FIG. 7B) without using a separately defined channel for data exchange between terminals in a cooperative diversity mode. As illustrated in FIG. 7A, a first terminal 702 transmits data to a base station 704 using a subchannel allocated to the first terminal 702. A second terminal 703 receives uplink data of the first terminal 702 through a listening-to operation. Moreover, the second terminal 703 transmits data to the base station 704 via a channel allocated to the first terminal 702, and the first terminal 702 receives uplink data of the second terminal 703 through the listening-to operation. When the first terminal 702 and the second terminal 703 receive data, the data is received in a state where mutual data is mixed. Accordingly, each terminal should remove extraneous data using, for example, an echo canceller when receiving data.

Also, as illustrated in FIG. 7B, the first terminal 702 space-time encodes the data received from the second terminal 703, and transmits the encoded data to the base station 704. The second terminal 703 also space-time encodes the data received from the first terminal 702 and transmits the encoded data to the base station 704.

Summarizing, aspects of the present invention perform a listening-to operation (as illustrated in FIG. 7A) and an overlapping cooperative space-time encoding operation (as illustrated in FIG. 7B) in each allocated subchannel, without allocating a separate subchannel for data exchange between terminals configuring the cooperative diversity pair.

Figure 8:
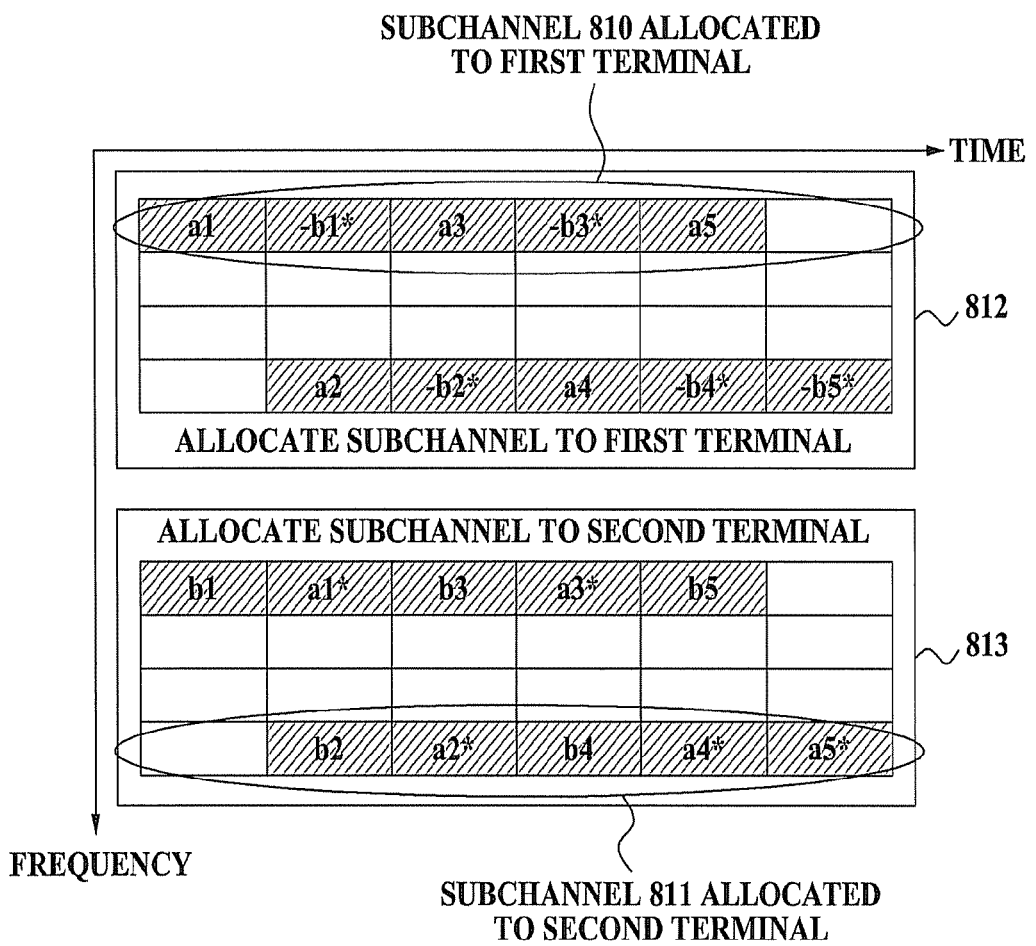
FIG. 8 is a diagram illustrating a process of exchanging data between terminals of a cooperative diversity pair and space-time encoding the exchanged data according to another embodiment of the present invention.

FIG. 8 is a diagram illustrating a process of exchanging data between terminals of a cooperative diversity pair and space-time encoding the exchanged data according to another embodiment of the present invention. Referring to FIGS. 7A, 7B, and 8, a method of exchanging and using subchannels allocated to terminals for data exchange between terminals configuring a cooperative diversity pair is described as follows.

The first terminal 702 and the second terminal 703 each transmit data 812 and 813 to the base station 704 via a subchannel 810 allocated to the first terminal. Simultaneously, the first terminal 702 receives data of the second terminal 703, and the second terminal 703 receives data of the first terminal 702. The received data is transmitted to the base station 704 via a subchannel of a subsequent time slot going through a space-time encoding process. The first terminal 702 transmits second data of the second terminal 703 to the second terminal 703 via a subchannel 811 allocated to the second terminal 703. The second terminal 703 transmits second data of the first terminal 702 to the first terminal 702 via a subchannel 811 allocated to the second terminal 703. In this instance, the first terminal 702 and the second terminal 703 respectively receive the transmitted data, and the data is also transmitted to the base station 704 via a subchannel of a subsequent time slot going through a space-time encoding process.

Figure 9:
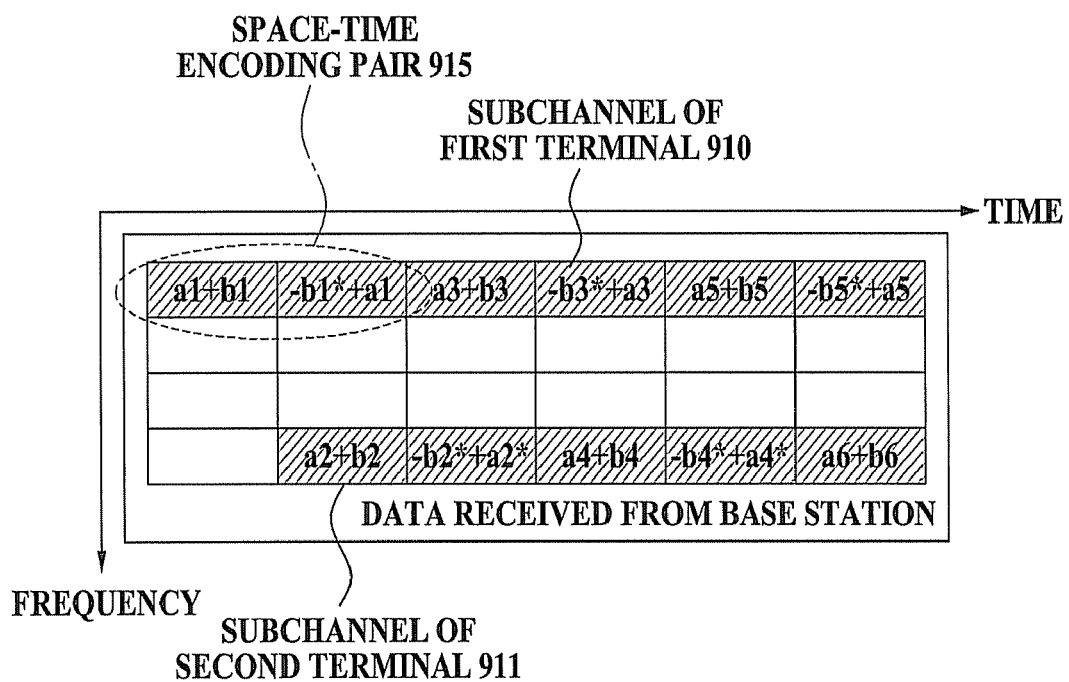
FIG. 9 is a diagram illustrating a form of the space-time encoded data that a base station receives in FIG. 8.

FIG. 9 is a diagram illustrating a form of the space-time encoded data that a base station receives in FIG. 8. Referring to FIGS. 7A, 7B, 8, and 9, a process in which a base station receives space-time encoded data is described as follows. First, it can be verified that the data that the base station 704 receives (alternately through a subchannel of the first terminal 910 and a subchannel of the second terminal 911) is data in a space-time encoding pair 915. The received space-time encoding pair 915 can be decoded via Equation 2, although not limited thereto.

As described above, according to aspects of the present invention, there is provided a cooperative diversity method and apparatus that can easily retrieve adjacent terminals to configure a cooperative diversity pair thereby minimizing a signal interference. Specifically, aspects of the present invention use a spectrum sensing method of a CR technology to increase a reliability of a link when performing uplink communication in a wireless communication environment of a point to multi-point structure.

Also, according to aspects of the present invention, there is provided a cooperative diversity method and apparatus that can use an existing channel without allocating a separate channel for data exchange between terminals entering a cooperative diversity mode, thereby maximizing efficiency of a wireless resource. Specifically, a subchannel of a cluster sufficiently spaced apart from a cluster configuring a cooperative diversity pair or subchannels allocated to terminals entering the cooperative diversity mode can be used. The subchannels allocated to terminals entering the cooperative diversity mode can be used when a cluster sufficiently spaced apart from the another cluster can be easily retrieved or when a cluster sufficiently spaced apart from the another cluster cannot be easily retrieved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooperative diversity method, the method comprising:
   determining a first terminal and a second terminal to be a first cooperative diversity pair according to a spectrum sensing result of a cognitive radio (CR) for each of the first terminal and the second terminal, the spectrum sensing result of the CR for the first terminal being different from the spectrum sensing result of the CR for the second terminal due to a power difference of signals from cells that are respectively adjacent to the first and second terminals, the determining of the first terminal and the second terminal comprising selecting, as the second terminal, a terminal having a most similar spectrum data to spectrum data of the spectrum sensing result of the CR for the first terminal from among a plurality of terminals;
   selecting a subchannel of the first cooperative diversity pair through which data is exchanged between the first terminal and the second terminal; and
   transmitting the data between the first terminal and the second terminal through the selected subchannel of the first cooperative diversity pair.

2. The method as claimed in claim 1, wherein the second terminal is most adjacent to the first terminal from among the plurality of terminals.

3. The method as claimed in claim 1, wherein the selecting of the subchannel comprises:
   retrieving a second cooperative diversity pair; and
   selecting a subchannel of the retrieved second cooperative diversity pair as the subchannel through which the data is exchanged between the first terminal and the second terminal.

4. The method as claimed in claim 3, wherein the retrieving of the second cooperative diversity pair comprises:
   selecting the second cooperative diversity pair as having a lowest generated interference from the first cooperative diversity pair when the data is transmitted between the first terminal and the second terminal through the selected subchannel of the second cooperative diversity pair.

5. The method as claimed in claim 3, wherein the retrieving of the second cooperative diversity pair comprises:
   designating adjacent terminals having a lowest received power in spectrum sensing results of a CR from among a plurality of terminals of a cell as a first terminal and a second terminal of the second cooperative diversity pair.

6. The method as claimed in claim 3, wherein the second cooperative diversity pair is configured to transmit and receive data to/from a base station through the selected subchannel of the second cooperative diversity pair.

7. The method as claimed in claim 1, wherein the selecting of the subchannel comprises:
   determining a subchannel allocated to the first terminal as the subchannel of the first cooperative diversity pair.

8. The method as claimed in claim 7, wherein the first terminal is configured to transmit and receive data to/from a base station through the subchannel allocated to the first terminal.

9. The method as claimed in claim 1, further comprising:
   encoding the data and transmitting the data to a base station.

10. The method as claimed in claim 9, wherein the encoding of the data comprises:
    space-time encoding the data using an Alamouti code.

11. A cooperative diversity apparatus, the apparatus comprising:
    a determiner configured to:
      determine a first terminal and a second terminal to be a first cooperative diversity pair according to a spectrum sensing result of a cognitive radio (CR) for each of the first terminal and the second terminal, the spectrum sensing result of the CR for the first terminal being different from the spectrum sensing result of the CR for the second terminal due to a power difference of signals from cells that are respectively adjacent to the first and second terminals; and
      select, as the second terminal, a terminal having a most similar spectrum data to spectrum data of the spectrum sensing result of the CR for the first terminal from among a plurality of terminals;
    a selector configured to select a subchannel of the first cooperative diversity pair through which data is exchanged between the first terminal and the second terminal; and
    a transmitter configured to transmit the data between the first terminal and the second terminal through the selected subchannel of the first cooperative diversity pair.

12. The apparatus as claimed in claim 11, wherein the second terminal is most adjacent to the first terminal from among a plurality of terminals.

13. The apparatus as claimed in claim 11, wherein the selector is further configured to retrieve a second cooperative diversity pair and select a subchannel of the retrieved second cooperative diversity pair as the subchannel through which the data is exchanged between the first terminal and the second terminal.

14. The apparatus as claimed in claim 13, wherein the selector is further configured to select the second cooperative diversity pair as having a lowest generated interference from the first cooperative diversity pair when the data is transmitted between the first terminal and the second terminal through the selected subchannel of the second cooperative diversity pair.

15. The apparatus as claimed in claim 13, wherein the selector is further configured to designate adjacent terminals having a lowest received power in spectrum sensing results of a CR from among a plurality of terminals of a cell as a first terminal and a second terminal of the second cooperative diversity pair.

16. The apparatus as claimed in claim 13, wherein the second cooperative diversity pair is configured to transmit and receive data to/from a base station through the selected subchannel of the second cooperative diversity pair.

17. The apparatus as claimed in claim 11, wherein the selector is further configured to determine a subchannel allocated to the first terminal as the subchannel of the first cooperative diversity pair.

18. The apparatus as claimed in claim 17, wherein the first terminal is configured to transmit and receive data to/from a base station through the subchannel allocated to the first terminal.

19. The apparatus as claimed in claim 11, further comprising:
    a second transmitter configured to encode the data and transmit the data to a base station.

20. The apparatus as claimed in claim 19, wherein the second transmitter space-time is configured to encode the data using an Alamouti code.

21. The apparatus as claimed in claim 11, further comprising:
    a terminal including a CR function.

22. A cooperative diversity method in a wireless communication system, the method comprising:
    determining a first terminal and a second terminal to be a cooperative diversity pair according to a spectrum sensing result of a cognitive radio (CR) for each of the first terminal and the second terminal, the spectrum sensing result of the CR for the first terminal being different from the spectrum sensing result of the CR for the second terminal due to a power difference of signals from cells that are respectively adjacent to the first and second terminals, the determining of the first terminal and the second terminal comprising selecting, as the second terminal, a terminal having a most similar spectrum data to spectrum data of the spectrum sensing result of the CR for the first terminal from among a plurality of terminals.

23. The method as claimed in claim 22, wherein the second terminal is most adjacent to the first terminal from among the plurality of terminals.

24. A cooperative diversity method in a wireless communication system, the method comprising:
    selecting an existing subchannel configured to transmit and receive data to/from a base station; and
    transmitting data between a first terminal and a second terminal of a first cooperative diversity pair through the selected existing subchannel,
    wherein the second terminal has a most similar spectrum data to spectrum data of a spectrum sensing result of a cognitive radio (CR) which is different due to a power difference of signals from adjacent cells for the first terminal from among a plurality of terminals.

25. The method as claimed in claim 24, wherein the selecting of the existing subchannel comprises:
retrieving a second cooperative diversity pair; and
selecting a subchannel of the retrieved second cooperative diversity pair as the existing subchannel through which the data is transmitted between the first terminal and the second terminal.

26. The method as claimed in claim 25, wherein the retrieving of the second cooperative diversity pair comprises:
selecting the second cooperative diversity pair as having a lowest generated interference from the first cooperative diversity pair when the data is transmitted between the first terminal and the second terminal through the existing subchannel.

27. The method as claimed in claim 25, wherein the retrieving of the second cooperative diversity pair comprises:
designating adjacent terminals having a lowest received power in spectrum sensing results of a cognitive radio (CR) from among a plurality of terminals of a cell as a first terminal and a second terminal of the second cooperative diversity pair.

28. The method as claimed in claim 25, wherein the second cooperative diversity pair is configured to transmit and receive data to/from a base station through the selected subchannel of the second cooperative diversity pair.

29. The method as claimed in claim 24, wherein the selecting of the existing subchannel comprises:
determining a subchannel allocated to the first terminal as the subchannel through which the data is transmitted between the first terminal and the second terminal.

30. The method as claimed in claim 29, wherein the first terminal is configured to transmit and receive data to/from a base station through the subchannel allocated to the first terminal.

31. A terminal of a cooperative diversity system, the terminal comprising:
a determiner configured to:
determine an other terminal to bind to according to a spectrum sensing result of a cognitive radio (CR) for each of the terminal and the other terminal in order to create a cooperative diversity pair, the spectrum sensing result of the CR for the terminal being different from the spectrum sensing result of the CR for the other terminal due to a power difference of signals from cells that are respectively adjacent to the terminal and the other terminal; and
select, as the other terminal, a terminal having a most similar spectrum data of the spectrum sensing result of the CR for the terminal from among a plurality of terminals.

32. The terminal as claimed in claim 31, wherein the other terminal is most adjacent to the terminal from among the plurality of terminals.

33. The terminal as claimed in claim 31, wherein the terminal comprises a mobile phone.

34. A cooperative diversity system comprising:
a first cooperative diversity pair comprising a first terminal and a second terminal, the first cooperative diversity pair being configured to select a data exchange subchannel through which data of the first terminal and the second terminal is exchanged between the first terminal and the second terminal, the second terminal having a most similar spectrum data to spectrum data of a spectrum sensing result of a cognitive radio (CR), the spectrum sensing result of the CR for the first terminal being different from the spectrum sensing result of the CR for the second terminal due to a power difference of signals from cells that are respectively adjacent to the first and second terminals;
a base station to which data is transmitted; and
a second cooperative diversity pair configured to transmit the data to the base station through the data exchange subchannel.

35. The cooperative diversity system as claimed in claim 34, wherein the first cooperative diversity pair is further configured to select the second cooperative diversity pair from a plurality of cooperative diversity pairs.

36. The cooperative diversity system as claimed in claim 35, wherein the first cooperative diversity pair is further configured to select the second cooperative diversity pair as having a lowest generated interference from the first cooperative diversity pair when the data is exchanged between the first terminal and the second terminal through the data exchange subchannel.

37. The method as claimed in claim 1, wherein spectrum sensings related to the spectrum sensing results for the first and second terminals are performed with respect to a channel located between the first and second terminals and the cells that are respectively adjacent to the first and second terminals.

38. The method as claimed in claim 1, wherein a first spectrum sensing is performed with respect to a channel between the first terminal and the cells that are adjacent to the first terminal, and
wherein a second spectrum sensing is performed with respect to a channel between the second terminal and the cells that are adjacent to the second terminal.

39. The apparatus as claimed in claim 11, wherein spectrum sensings related to the spectrum sensing results for the first and second terminals are performed with respect to a channel located between the first and second terminals and the cells that are respectively adjacent to the first and second terminals.

40. The method as claimed in claim 11, wherein a first spectrum sensing is performed with respect to a channel between the first terminal and the cells that are adjacent to the first terminal, and
wherein a second spectrum sensing is performed with respect to a channel between the second terminal and the cells that are adjacent to the second terminal.

* * * * *